United States Patent
Thorne

(10) Patent No.: US 9,841,488 B2
(45) Date of Patent: Dec. 12, 2017

(54) IR DETECTOR SYSTEM AND METHOD

(75) Inventor: Peter Michael Thorne, Basildon (GB)

(73) Assignee: LEONARDO MW LTD, Basildon, Essex (GB)

( * ) Notice: Subject to any disclaimer, the term of this patent is extended or adjusted under 35 U.S.C. 154(b) by 0 days.

(21) Appl. No.: 13/203,220

(22) PCT Filed: Feb. 23, 2010

(86) PCT No.: PCT/EP2010/052291
§ 371 (c)(1),
(2), (4) Date: Aug. 24, 2011

(87) PCT Pub. No.: WO2010/097390
PCT Pub. Date: Sep. 2, 2010

(65) Prior Publication Data
US 2012/0001073 A1    Jan. 5, 2012

(30) Foreign Application Priority Data
Feb. 24, 2009   (GB) .................................. 0903091.7

(51) Int. Cl.
*G01J 5/02*    (2006.01)
*G01S 3/784*   (2006.01)
*H04N 5/374*   (2011.01)

(52) U.S. Cl.
CPC ............. *G01S 3/784* (2013.01); *H04N 5/374* (2013.01); *H04N 5/3742* (2013.01)

(58) Field of Classification Search
CPC ....... H04N 5/374; H04N 5/378; H04N 5/3742
USPC .................... 250/339.01, 370.14, 342, 206.1
See application file for complete search history.

(56) References Cited

U.S. PATENT DOCUMENTS

| | | | |
|---|---|---|---|
| 6,137,566 A | 10/2000 | Leonard et al. | |
| 6,310,805 B1 * | 10/2001 | Kasa et al. | 365/200 |
| 7,397,019 B1 | 7/2008 | Byars et al. | |
| 2006/0021498 A1 | 2/2006 | Moroz et al. | |
| 2006/0180746 A1 * | 8/2006 | Muenter | F41G 3/14 250/214 R |
| 2007/0034776 A1 | 2/2007 | Weber et al. | |
| 2008/0107408 A1 * | 5/2008 | Sugie | 388/815 |
| 2013/0126703 A1 * | 5/2013 | Caulfield | H04N 5/30 250/206 |

OTHER PUBLICATIONS

International Search Report (PCT/ISA/210) dated Jun. 10, 2011, by European Patent Office as the International Searching Authority for International Application No. PCT/EP2010/052291.
Written Opinion (PCT/ISA/237) dated Jun. 10, 2011, by European Patent Office as the International Searching Authority for International Application No. PCT/EP2010/052291.

* cited by examiner

*Primary Examiner* — Kenneth J Malkowski
(74) *Attorney, Agent, or Firm* — Buchanan Ingersoll & Rooney PC

(57) ABSTRACT

An Infra Red detector system and method is disclosed that implements a digital coordinate generator onto a 2D focal plane array infrared detector. The method used in this form of the invention by the IR detector system, generates X-Y coordinate data for pixels containing detected target data. Advantageously, it reduces subsequent signal post processing required to generate the same data using numerical processing techniques in software and the latency that this introduces.

11 Claims, 4 Drawing Sheets

IR DETECTOR SYSTEM AND METHOD

The invention relates to an Infra Red (IR) detector system and method. More specifically, but not exclusively, it relates to an IR detector system and method for hostile target detection, in which a coordinate generator is integrated with an IR signal detector system to reduce signal post processing requirements, improve speed and reduce detection latency.

Conventional IR detector systems exist for detecting hostile targets. Most techniques rely on signal processing of data to locate and generate target coordinate data by numerical methods. It is a problem with such systems that operation of the system requires significant processing resources, can be slow and introduce significant latency.

According to the invention there is provided an IR detector system for hostile target location comprising a focal plane array (FPA) detector in which a digital coordinate generator is located on the focal plane array detector.

In this way, the present system generates physical X-Y coordinate data for pixels containing detected target data on the FPA detector, thereby increasing operating speed of the system.

Advantageously, it reduces subsequent signal post processing required to generate the same data using numerical processing techniques in software and the latency that this introduces.

According to the invention there is further provided an IR detector system comprising a FPA detector, a coordinate generator, and a storage device in which the coordinate generator and the signal detector are integrated on the FPA detector such that post processing of signals generated is improved.

Furthermore, one form of the present invention allows target coordinate data to be made available concurrently with readout.

The invention will now be described with reference to the following drawings in which.

For the purpose of describing the present invention, a typical system realised using circuits integrated with a full TV array format ROIC equipped with in-pixel target signal detection as disclosed in a simultaneously filed UK Patent Application and hereby incorporated by reference is described.

Figure 1:
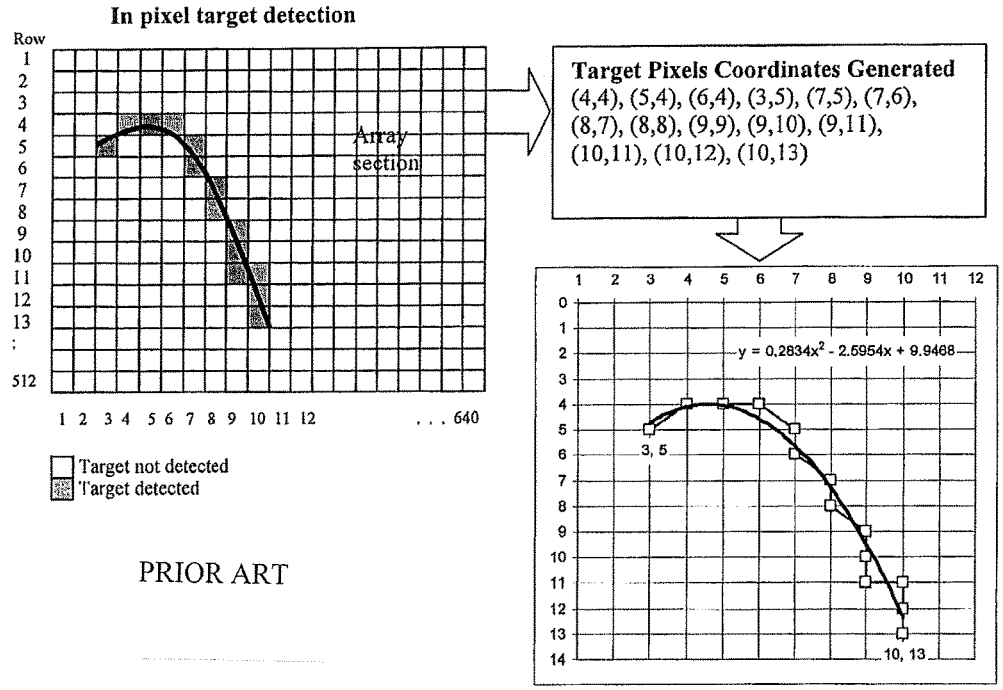
FIG. 1 is a typical target trajectory being detected, showing a good curve fit to extract target pixel coordinate data (Note: pixels not to scale)

FIG. 1 shows a typical target trajectory being detected, showing a good curve fit to extract target pixel coordinate data (Note: pixels not to scale). The image of the trajectory of a typical ballistic infrared target is previously captured using an in-pixel signal detection technique such as that disclosed in the patent application described above. Target data then exists in the pixel array and is illustrated as the greyed out pixel bit map data as shown in FIG. 1. It should be noted that multiple targets generate additional traces which in no way inhibits the operation or performance of the invention. Coordinate generated are generated for each element detected, are treated in exactly the same way, and would require other processing to techniques to discriminate between the different targets.

Figure 2A:
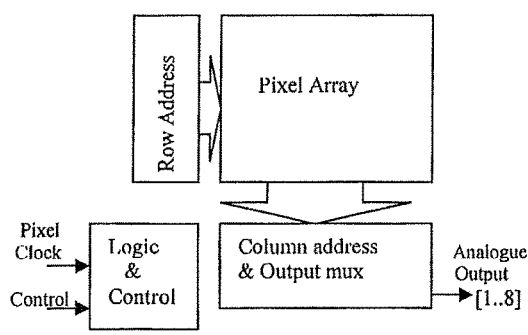
FIG. 2a is a typical 2D ROIC architecture, and 2b is a typical 2D ROIC with digital signal detection circuits.

A conventional infrared 2D detector ROIC architecture is shown in FIG. 2(a) and comprises a pixel imaging array, row and column address and output structure. Such designs are widely known and described in detail elsewhere. The array is operated to stare at the scene and capture an image as data held in the pixel array. Pixel data are output using a conventional X-Y raster scan technique under the control of the Pixel Clock input. The control logic clocks the row and column to address and output the pixel data array row by row. The first row is addressed and pixel data are output from the array on one or more outputs. Providing more outputs allows the data bandwidth of the detector to be increased. A 640×512 full TV format infrared detector typically has 8 outputs. Pixel array data is therefore output 8 columns at a time per pixel clock beat. Rows are output one at a time in sequence until all pixel data are output in this way. The pixel array is then reset ready to image the next frame.

Figure 2B:
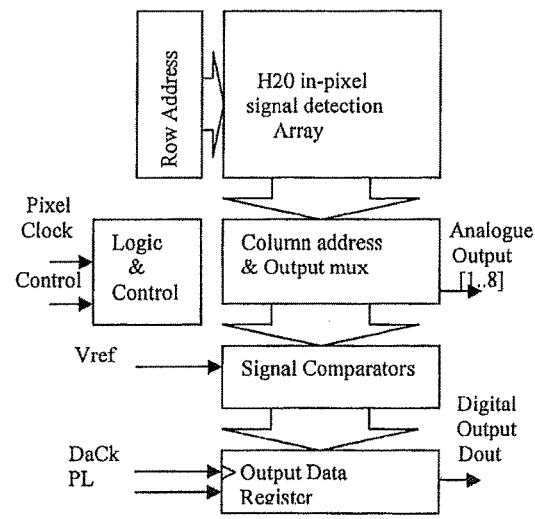

In-pixel signal detection can also be achieved using the architecture shown in FIG. 2(b) a sample and hold structure that provides an Integrate While Read operated using a SKIM technique as described in invention disclosed above. Extremely high detected signal data rates may be achieved by using the pixels to detect targets of interest.

In a manner similar to that described with reference to FIG. 2a, the array is operated to stare at the scene and capture an image as data held in the pixel array. Target information is determined using the in-pixel detection technique. Pixel data are output using a conventional X-Y raster scan technique whereby data are addressed a row at a time and comparators transfer this target data against a user level (Vref) into the digital domain and is latched in the Output Data Register when the Parallel Load (PL) signal is operated after each row is addressed and the comparator outputs have settled. Data in the Output Data Register are then clocked out using the output Data Clock (DaCk) from the output data port (Dout) at extremely high data rate. The process is repeated until all rows and target data have been output.

In this way, the present invention implements a digital coordinate generator function onto a 2D focal plane array infrared detector. That is to say that one form of the invention implements a method to detect, acquire and store X-Y coordinate data for detected target pixels directly from detected target data when the pixel array data is scanned out. The data store is available during the readout process to allow coordinate data to be accessed concurrently with readout.

Figure 3:
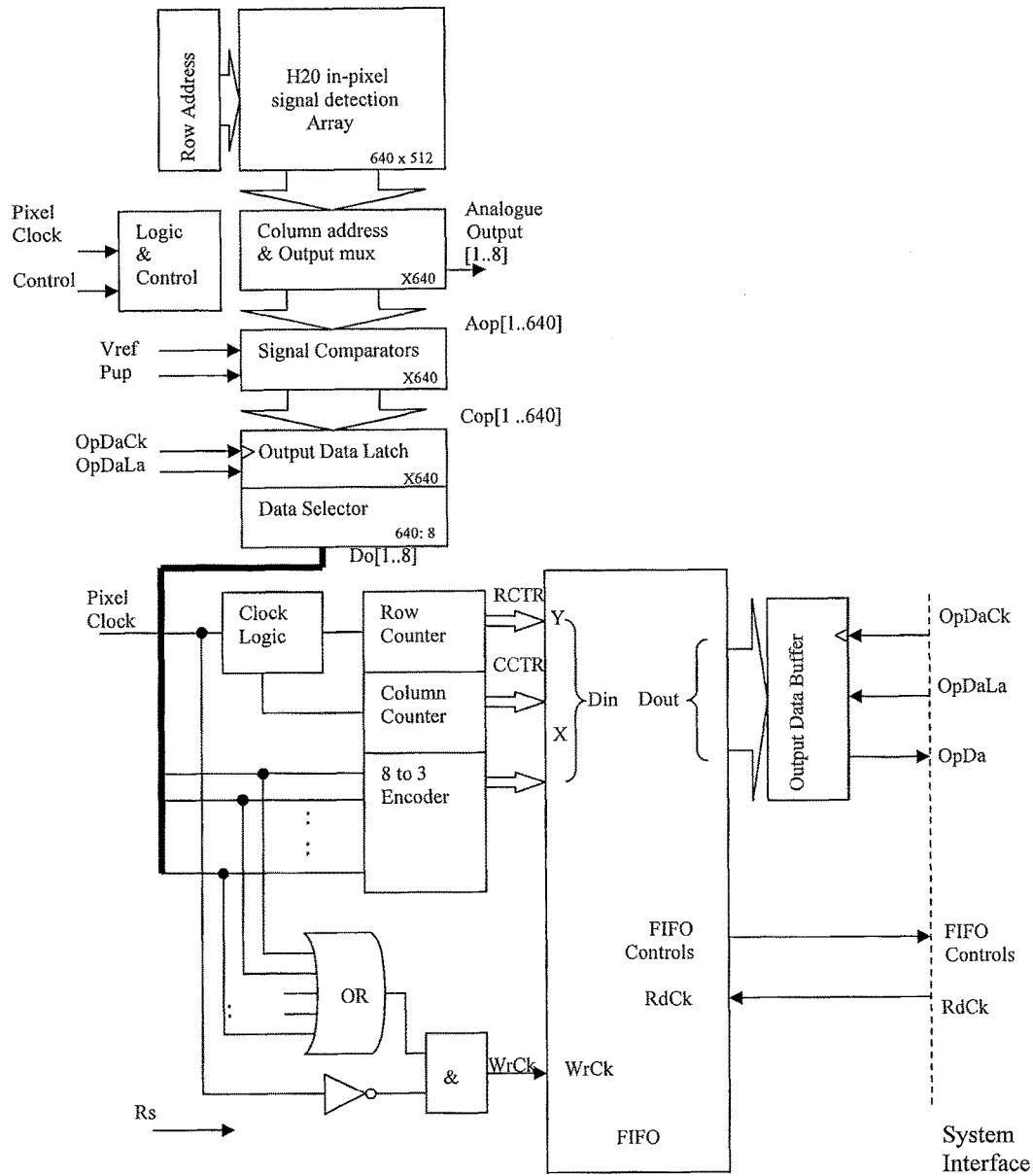
FIG. 3 is a schematic diagram showing one form of row and column coordinate data generation logic for the present invention.
Figure 4:
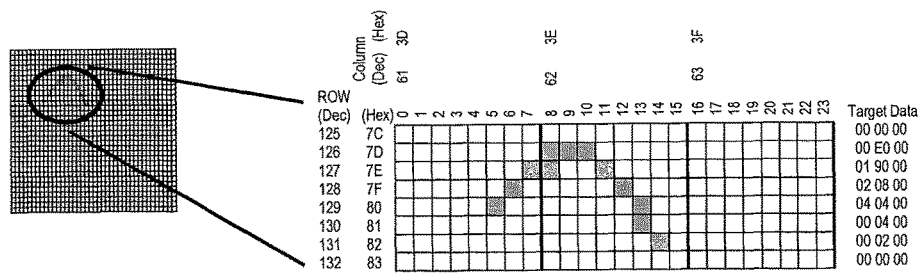
FIG. 4 is a schematic section showing one form of pixel array showing target pixels and extracted X-Y row and column coordinate data in accordance with the present invention.

The circuits proposed herein will detect these target pixels and generate their X-Y coordinate positions from them when the array of target pixel data is read out. The coordinate data is held in a data store to be read out by the host system for subsequent processing by the host system Target data is acquired and output using known techniques or techniques described in detail in the simultaneously filed UK patent application whereby the array is operated to stare at the scene and capture an image as data held in the pixel array. Target information is determined using the in-pixel detection technique. Pixel data are then output using a conventional X-Y scan whereby the data are addressed a row at a time as shown in FIG. 3. One form of data acquisition timing is shown in FIG. 4.

The Signal Comparators are powered up at the row start using a Power Up control (Pup). The comparators operate and transfer this target data (Aop) against a user level (Vref) into the digital domain (Cop) that is latched in an Output Data Latch when an Output Data Latch signal (OpDaLa) is operated after each row is addressed and the comparators outputs have settled. With the data latched, the comparators are powered down to reduce power consumption. This approach allows the next row to be processed in parallel with determining the X-Y coordinate by the following circuit improving speed. Digital data (Do[1 . . . 8]) are output 8 columns at a time under the control of the Output Data Clock (OpDaCk) through a Data Selector.

As the pixel array is clocked, the same signal is used to clock row and column counters, the counters containing the address of the pixel data. In this example, rows are typically addressed one at a time whereas columns are addressed in blocks of eight corresponding to the number of outputs implemented to increase the data bandwidth. However, it will be appreciated that the circuit will operate with any reasonable number of outputs. The column counter increments with each pixel clock beat to the value expressed by the number of pixel array columns divided by the number of outputs and rolls over to start at column 1 again at the end of the X scan. The data Do[1 . . . 8] provides X coordinate data that taken with the column counter data provides pixel level X coordinate data. The row counter increments with each full column scan completed to a value representing the number of rows to be addressed. The counter rolls over to start at row 1 at the end of the Y scan. The column counter increments in blocks of 8 corresponding the number of outputs. The row and column address are contained in the row and column counters that have data RCTR and CCTR.

The counter data RCTR, CCTR and Do[1 . . . 8], representing the pixel array X-Y address, are connected to the Data Input (Din) of a storage device. A First in First Out register (FIFO) register is considered for this application but others are suitable. The operation of a FIFO storage device is well known and described widely elsewhere. The FIFO data width is chosen to suit the array format of the detector. For a Full TV size of 640 columns by 512 rows, 10 bits are required for the column and 9 bits for the row counters. The digital output data contain the address of detected target pixels. These may be encoded from 8 to 3 data bits corresponding to the number of outputs to conserve FIFO memory. 22 bits of data memory are therefore required (note this is easily realised conventionally by using for example, 3×8 bit devices or IP blocks in parallel giving a capacity of, say, 10 bits for the row, 11 bits for the column and 3 bits for the outputs to suit an array format up to 1024 rows×2048 columns and 8 outputs).

Data in the Output Data Latch contains the detected target data and also positional information corresponding to the column in which the detected target exists. This data is used in combination with the column counter data to determine the pixel array column in which the data is physically located in each group of addressed pixel columns x8. Where target data has been detected the latch output is asserted HIGH and where no target data is detected the latch output is retracted LOW. As the latch data Do[1 . . . 8] are clocked out of the Output Data Latch through the Data Selector 8 bits at a time, data set in the latch is detected by the OR gate and used to gate a clock signal using the AND gate to produce a Write Clock (WrCk) to clock the row and column counter and output address data into the FIFO. This technique ensures only target data is detected and written to the FIFO. This example inverts the clock to use the negative edge to latch the data after it has settled although any suitable clock source could be used.

The depth of the FIFO must be chosen to accommodate the highest number of detected target pixels that need to be stored between successive row readouts from the FIFO Data Out port (Dout). The number can be arbitrary and only limited by the data read rate and physical area required to accommodate the memory. It is envisaged that the minimum depth could be up to one row which for a 640×512 full TV format array would be 640 bytes. In practice, a depth of say 1 kB would accommodate data for nearly two rows giving additional storage capacity to the host system. Larger array formats would need a larger storage capacity and/or have higher data read rates from a host system. Alternatively the row and column scan could be transposed to reduce the requirement at expense of increasing the data read frequency.

FIFO data are read out at a suitable frequency to ensure the FIFO does not overflow FIFO control signals for example include EMPTY, HALF and FULL flags or similar which are self explanatory, which are used by host systems to manage data flow from the FIFO.

Figure 6:
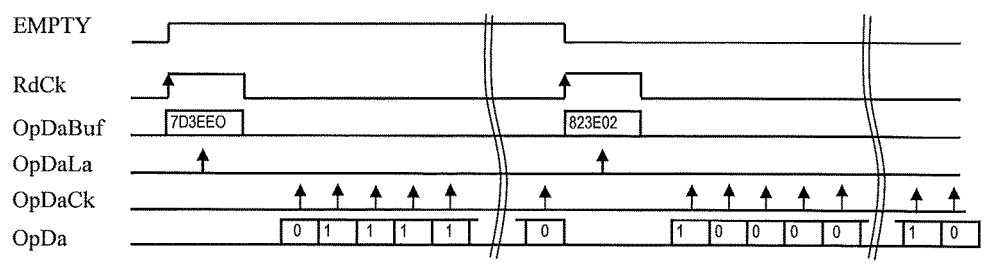
FIG. 6 is a schematic diagram showing typical FIFO read timing sequence to access target data in accordance with the present invention.

Target coordinate data are available to the host system using suitable interface circuits for the clock and data speeds considered either in parallel format when read out from the FIFO under the control of the Read Clock (RdCk) using the data FIFO controls outlined above or, better, by using a high speed serial data link by loading the data OpDaBuf into the Output Data Buffer using the Output Data Latch (OpDaLa) strobe which operates as a parallel to serial data register. Timing for one form of the present invention is shown in FIG. 6. Data are then clocked out of the Output Data Port (OpDa) using the Output Data Clock (OpDaCk).

The process is repeated until all rows and target data have been output to acquire a full frame of target X-Y coordinate data from the pixel array. Data may be read out from the FIFO at the end of the frame or concurrently with the row read cycle to reduce system latency in accessing detected target coordinate data. A Reset signal (Rs) is provided to clear data or synchronise the circuit to the host system.

Figure 5:
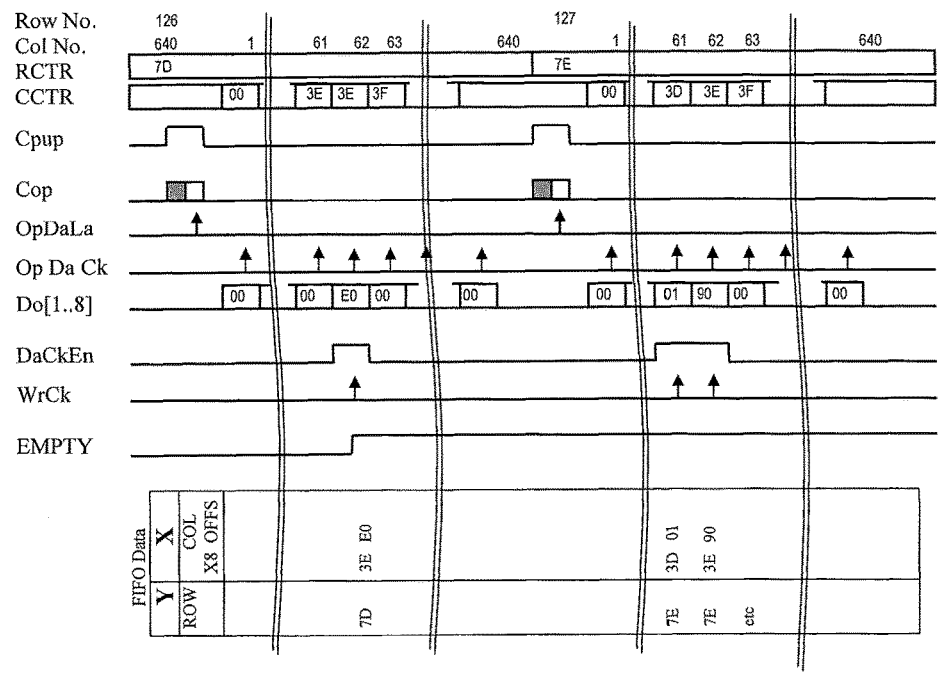
FIG. 5 is a schematic diagram showing typical First In First Out (FIFO) storage buffer device to write timing to for extracted X-Y row and column coordinate data.

FIG. 4 shows target data resulting from the example but map along with arbitrary row and column address data in decimal and hexadecimal formats. The first 3 target data bytes and the X-Y counter coordinate data are shown being written to FIFO memory in FIG. 5. FIG. 6 shows the first and last data being accessed from the FIFO and readout.

Subsequent processing of the target coordinate data using conventional data processing methodologies is used to discriminate single or multiple targets and to determine for example, trajectory, point of origin and fall of shot or target track, course or disposition and intent.

It is expected that the circuit can be operated at to at least 100 MHz achieving a full TV array read out in around 0.5 ms using 8 digital detector outputs enabling operation at frame rates well over 1 kHz.

It should be noted that the target detection and X-Y coordinate extraction circuits do not inhibit the normal infra red detector operation in thermal imaging mode though its Analogue Outputs. Having been configured and operated to detect targets, the same image data can then be readout conventionally for thermal imaging purposes. Regions of the image identified by the extracted target coordinate data may be more easily scrutinized. The coordinate data may be passed to other elements of a system for subsequent high resolution or active (BIL or 3D) imaging techniques. Image contrast may be affected by integration times used for target detection purposes but some trade off is expected to be possible with frame rate and detection threshold.

It will be appreciated that this technology is most suited to partner in-pixel signal detection techniques that produce digital target detection data as described elsewhere.

Furthermore, it will be appreciated that the present system and technique is best implemented on an infrared detector Read Out IC (ROIC) where access to the imaging clock, control and target data signals is easiest enabling highest speed and performance operation.

Moreover, the system and technique is aimed specifically at improving hostile target detection capability where operation at extremely high frame and data rates is required to acquire and discriminate targets. The form of invention described herein, reduces latency and the signal post processing required to rapidly detect weapon muzzle flash or projectile trajectories by integrating this key signal processing function in hardware onto a suitable infrared detector ROIC.

Additionally, the techniques embodied in the present invention provide the means to generate X-Y coordinate data directly from detected target data at the row rate. A FIFO storage device has been used to facilitate a data buffer to the host system.

It will be appreciated that the method described with reference to the present invention may also be integrated and operated with all other infrared detectors capable of generating in-pixel signal detection data.

The method described herein may be added to existing 2D imaging devices or better, can be integrated directly with target detection functions such as those described on a 2D focal plane array infrared detector to maximise speed.

It will be appreciated that the method and circuits described with reference to the present invention is not limited to full TV array formats and can be integrated to detectors or other imaging devices having other array formats e.g. half TV, HDTV, SGVA etc. . . .

It is expected that integrating this function directly with an infrared detector equipped with in-pixel target detection will provide a step change improvement in hostile target detection capability by providing detected signal coordinate data directly in X-Y format at extremely high frame rates of well over 1 kHz reducing subsequent data processing requirements and latency.

The invention claimed is:

1. An infrared (IR) detector system for a target location comprising:
    a focal plane array (FPA) detector configured to capture an image representative of a scene as pixel data, the FPA including:
    a digital coordinate generator configured to include:
    at least one comparator that uses a reference voltage to transfer pixel data that includes target data to a digital domain and latches the pixel data and associated row coordinate data of the focal plane array into an output data latch;
    a column counter configured to, for each row in the focal plane array associated with row coordinate data latched into the output data latch, increment on each pixel clock by a value determined by a total number of columns in the focal plane array divided by a total number of pixels that include target data in a respective row;
    a data selector that receives pixel data from the output data latch; and
    memory for storing pixel data output by the data selector,
    wherein the pixel data output from the data selector is combined with the column counter value to identify for each row in the array, one or more pixels that include target data, and the combined pixel data and column counter value is stored in the memory for output to a circuit configured to detect at least whether the target data includes one or more targets.

2. The IR detector system according to claim 1 in which the focal plane array detector is a read out integrated circuit.

3. The IR detector system according to claim 1 in which the digital coordinate generator is configured to control a flow of data into a storage device based on detected target data generated by the system.

4. The IR detector system according to claim 1 comprising:
    a first in first out (FIFO) storage device as the memory for buffering data generated to an external system in an IR FPA detector.

5. The IR detector system according to claim 1 comprising:
    a storage device configured to provide data concurrently with read out of target data generated by the FPA detector.

6. The IR detector system according to claim 1 in which the at least one comparator comprises:
    power saving means for powering up and powering down the at least one comparator such that power is saved for target data acquisition.

7. The IR detector system according to claim 1, wherein the at least one comparator comprises an array of comparators.

8. The IR detector system according to claim 1 comprising:
    at least one counter including a column counter configured to generate coordinate data for target detection.

9. The IR detector system according to claim 1, wherein the at least one comparator compares the pixel data to a predetermined reference level, addresses the pixel data one row at a time, and powers down once first digital data of a respective pixel row is output to the output data latch such that pixel data of a subsequent pixel row is converted to second digital data while the first digital data output from the respective pixel row is processed.

10. A method of generating digital coordinate data for a target in a system having a focal plane array (FPA) detector and at least one comparator, the method comprising:
    detecting an image via a pixel array of the FPA detector;
    transferring detected pixel data to a digital domain based on a reference voltage;
    latching the pixel data into an output data latch, the pixel data including target data and row coordinate data;
    incrementing, for each row in the focal plane array associated with row coordinate data latched into the output data latch, a column counter on each pixel clock by a value determined by a total number of columns in the focal plane array divided by a total number of pixels that include target data in a respective row;
    selecting pixel data from the output data latch based on a one row to plural column addressing scheme;
    combining the column counter value of a respective row with the selected pixel data of the respective row to identify pixel locations of the target data in each row of the pixel array, the combined column counter value and selected pixel data identifying for each respective row in the array, one or more pixels that include the target data;

generating a signal to store the combined data in memory; and storing the combined data in memory of the FPA detector based on the generated signal.

11. The method according to claim 10, comprising:

comparing, in the at least one comparator, the pixel data to the reference voltage by addressing the pixel data one row at a time; and powering down the at least one comparator when first digital data of a respective pixel row is output to the output data latch such that second pixel data of a subsequent pixel row is converted while the first digital data output from the respective pixel row is processed.

* * * * *